United States Patent [19]

Geary et al.

[11] 4,352,024
[45] Sep. 28, 1982

[54] EXPANDER-GENERATOR CONTROL SYSTEM

[75] Inventors: Carl H. Geary, Greensburg, Pa.; Norman A. Samurin, Houston, Tex.

[73] Assignee: Carrier Corporation, Syracuse, N.Y.

[21] Appl. No.: 260,231

[22] Filed: May 4, 1981

[51] Int. Cl.³ .............................................. F02G 3/00
[52] U.S. Cl. ........................................ 290/52; 290/2
[58] Field of Search ................... 290/2, 52; 60/39.03, 60/39.25

[56] References Cited

U.S. PATENT DOCUMENTS

| | | | |
|---|---|---|---|
| 2,973,771 | 3/1961 | Barth et al. | 137/57 |
| 3,374,680 | 3/1968 | Geary | 73/538 |
| 3,777,486 | 12/1973 | Damratowski | 60/39.25 X |
| 3,855,788 | 12/1974 | Damratowski | 60/39.03 |
| 3,998,058 | 12/1976 | Park | 290/2 X |
| 4,211,932 | 7/1980 | Geary, Jr. | 290/52 |

Primary Examiner—J. V. Truhe
Assistant Examiner—W. E. Duncanson, Jr.
Attorney, Agent, or Firm—J. Raymond Curtin; David J. Zobkiw

[57] ABSTRACT

An expander driven by waste heat fluid is operatively connected to a synchronous or induction generator. A brake/clutch controller selectively connects the power recovery string to an eddy current brake/flywheel in order to maintain line frequency and control speed during normal conditions and to minimize acceleration of the string during a load dump.

12 Claims, 4 Drawing Figures

EXPANDER-GENERATOR CONTROL SYSTEM

BACKGROUND OF THE INVENTION

In the recovery of certain distillates from crude oil in fractionation apparatus commonly known as fluid catalytic cracking plants, it is common practice to introduce a catalyst into the reactor employed in the plant in order to accomplish the desired distillation. As a result of the introduction of the catalyst into the reactor, the material used as the catalyst acquires a coating of carbonaceous material as a deposit tightly adhering to the surface thereof.

It has been found economical to remove the surface deposit from the catalyst in a regenerator so that the catalyst may be reintroduced or recycled into the reactor to maintain a continuous distillation cycle or operation. The coating or surface deposit, which is usually referred to as coke, is removed by subjecting the coated catalyst to air in a high temperature atmosphere within a regenerator in the form of a pressure vessel. The high temperature atmosphere comprises high pressure air serving as a fluidizing medium and a source of oxygen for combustion of accumulated surface deposits (coke) on the catalyst. This process is referred to as "burning off" the surface accumulation or coke from the catalyst.

Once the carbonaceous material has been removed from the surface of the catalyst, the catalyst is removed from the regenerator and reintroduced along with the crude oil into the reactor where the distillation process of the crude oil continuously occurs. The hot products of combustion created in the regenerator vessel and containing entrained catalyst particles are withdrawn from the vessel by venting them to the atmosphere through appropriate disposal devices such as a scrubber or the like for removing air contaminents or for recovering energy from the gas flow.

Commonly assigned U.S. Pat. No. 3,855,788 discloses a power recovery system in which a turbine is driven by the gaseous products of combustion from the regenerator vessel. The turbine, in turn, drives a string including an air compressor and a generator. Due to the relatively large volumes of gases created in the regenerator vessel, it is necessary to use relatively large valves in the four to five feet in diameter conduits leading from the vessel. Large valves are relatively slow in responding to manual or automatic signals which call for repositioning of the valve due to flow, pressure and/or temperature changes occurring in the vessel. Thus, undesirable operating conditions may occur before appropriate adjustment of flow control valves can be made and may continue for a period such that operation of the mechanical equipment would be terminated because of shaft overspeed. Control problems are overcome by providing a small diameter (on the order of one and one-half feet) bypass line around the turbine to control flow through the turbine in response to load demand. This arrangement, however, required a compressor to provide a full time load and presented some problems in retrofitting existing fluid catalytic cracking plants.

Commonly assigned U.S. Pat. No. 4,211,932 discloses a power recovery system in which a turbine drives a generator as the only load. The power recovery string serially includes a turbine or expander, a speed reducing mechanism, an induction or synchronous generator and an eddy current brake. Since this arrangement does not include the inherent power absorbing load of a compressor, the coils of the eddy current brake are excited to provide the necessary load during other than steady-state conditions such as when the electrical load of the generator is disconnected.

SUMMARY OF THE INVENTION

Basically, in a preferred embodiment, the present invention provides a control system for a power recovery system in which the synchronous generator of the power recovery string is synchronously controlled under normal operating conditions and in which a load in the nature of an eddy current brake or a flywheel is imposed under abnormal or non steady-state conditions such as during start up or a load dump to minimize acceleration of the string. An electronic governor controls the power recovery string in response to the inlet temperature and/or pressure of the process fluid and the generator shaft speed. Control is achieved by the positioning of an inlet throttle valve and/or actuating a brake control or magnetic clutch which couples the power recovery string to a brake or flywheel respectively. Overall control of the string is accomplished by the interaction of the electronic governor, the brake or clutch controller and the generator switch gear in the various modes of string operation.

Accordingly, it is an object of this invention to recover the energy available in high temperature waste heat fluids in a more efficient and economical manner.

It is a further object of this invention to utilize waste heat fluids in a power generating system incorporating an expander driving a generator and having dynamic power absorbing means connected thereto.

It is a further object of this invention to provide a power generating system employing waste heat fluids which is suitable for retrofitting existing installations.

It is yet another object of this invention to utilize waste heat fluids to generate power via expansion of the fluid through a turbomachine, with the turbomachine being connected to a brake or flywheel which is used to regulate the speed of the turbomachine at other than steady-state conditions.

It is an additional object of this invention to provide a control system for maintaining a steady-state condition under normal operating conditions.

It is a further object of this invention to provide a control system for automatically providing a suitable load during non steady-state conditions in order to provide synchronization during start up, to change speed and to minimize acceleration of the string during a load dump.

It is a yet still further object of this invention to provide a control system for use with a power recovery system having a synchronous or induction generator as the load. These objects, and others as will become apparent hereinafter, are accomplished by the present invention.

BRIEF DESCRIPTION OF THE DRAWING

For a fuller understanding of the present invention, reference should now be made to the following detailed description thereof taken in conjunction with the accompanying drawing wherein.

DESCRIPTION OF THE PREFERRED EMBODIMENTS

Figure 1:
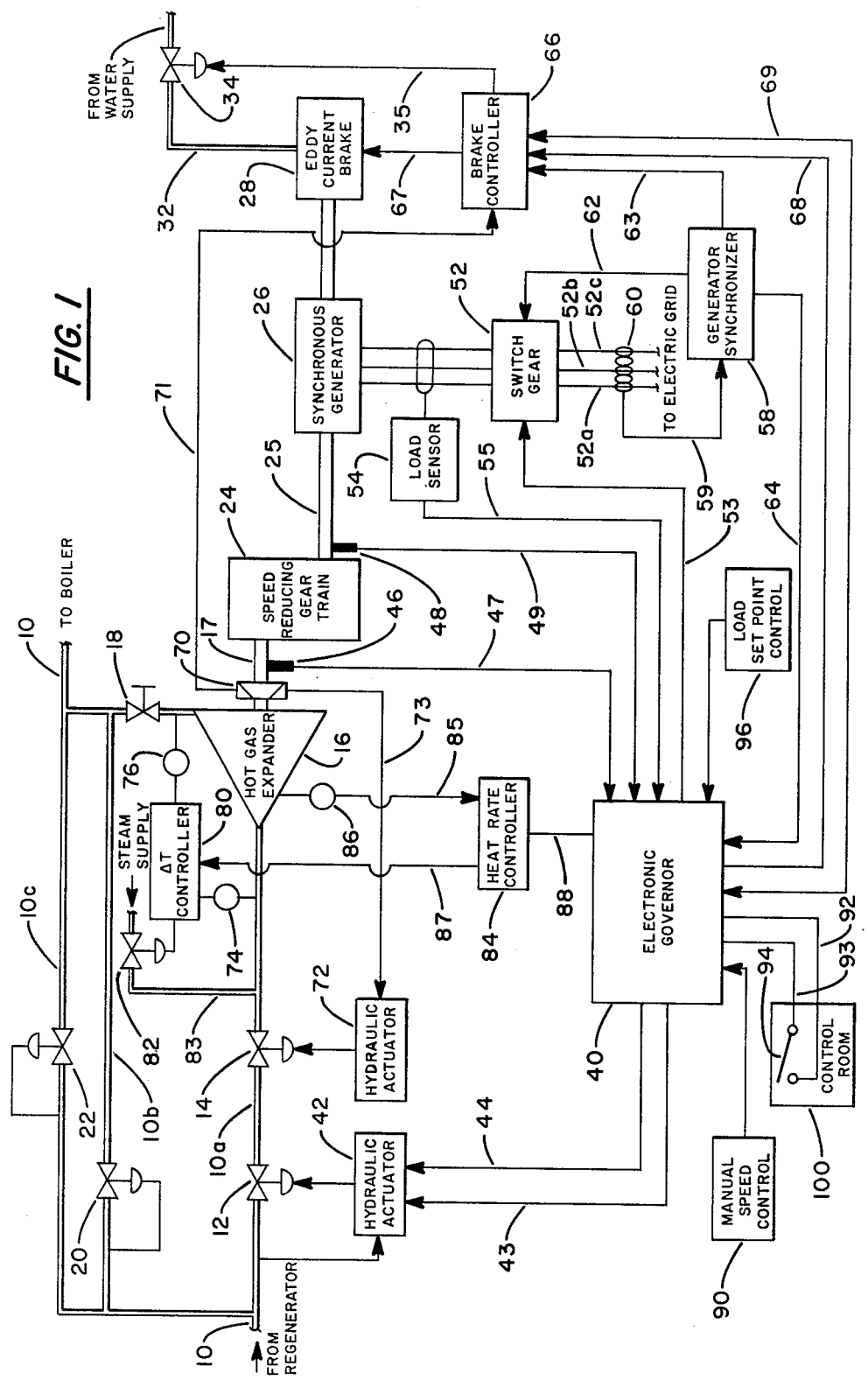
FIG. 1 is a schematic representation of the control system for the heat recovery system of a fluid catalytic cracker having a synchronous generator as the load and an eddy current brake.

Referring to FIG. 1, the heated process fluid is supplied from the regenerator vessel (not illustrated) of a fluid catalytic cracker via line 10 which branches into three parallel lines, 10a, 10b and 10c, before recombining to supply the process fluid, as fuel, to a boiler (not illustrated). Line 10a serially includes inlet control valve 12, high speed trip valve 14, hot gas expander 16 and isolation valve 18. Lines 10b and 10c contain regenerator pressure control valves 20 and 22, respectively. Valves 12, 14 and 18 are butterfly valves. Valve 20 and line 10b are much smaller (about one to one and one-half feet in diameter) than valve 22 and line 10c (about four to five feet in diameter) to provide a quicker response.

The power recovery string serially includes hot gas expander 16, speed reducing gear train 24, synchronous generator 26 and eddy current brake 28. The overall control of the system is accomplished by electronic governor 40 which may be a model 43027 electronic governor manufactured by Woodward Governor Company of Fort Collins, Colo. Inlet control valve 12 is directly controlled by hydraulic actuator 42 which is responsive to the pressure upstream of valve 12. Additionally, actuator 42 is connected to governor 40 via lines 43 and 44 for positioning valve 12 in response to the rotational speed of the power recovery string and load demand, respectively, as well as for closing valve 12 in response to an overspeed trip signal. Shaft speed sensors 46 and 48 are located on the hot gas expander shaft 17 and generator shaft 25, respectively, and are connected to governor 40 via lines 47 and 49, respectively, to provide rotational speed signals thereto. Synchronous generator 26 is connected to the electric grid through generator switch gear 52. Load sensor 54 senses the load on generator 26 and transmits this information to governor 40 via line 55. Generator synchronizer 58 which is functionally a part of governor 40 is operatively connected to phase sensor 60 via line 59. Phase sensor 60 senses the phase of the electricity being supplied to the electric grid via lines 52a–c and sends a signal indicative thereof to synchronizer 58 which, in response thereto, controls switch gear 52 via line 62 and eddy current brake controller 66 via line 63. Suitable eddy current brake controllers are the Eaton 6000 series which are manufactured by Eaton Power Transmission Systems of Kenosha, Wis. Synchronizer 58 is connected to governor 40 via line 64. Brake controller 66 is connected to eddy current brake 28 via line 67, to governor 40 via lines 68 and 69, respectively, and to high speed trip 70 via line 71. Additionally, brake controller 66 is connected to valve 34 in cooling water supply line 32 via line 35. Suitable high speed trips are disclosed in commonly assigned U.S. Pat. Nos. 2,973,771 and 3,374,680. Valve 14 is operatively connected to hydraulic actuator 72 which is operatively connected to high speed trip 70 via line 73. Suitable hydraulic actuators for use as actuators 42 and 72 are manufactured by M.E.A. Company of Des Plaines, Ill.

Temperature sensors 74 and 76 respectively sense the temperature of the process fluid upstream and downstream of expander 16 and transmit this information to differential temperature controller 80. Temperature controller 80 is operatively connected to valve 82 in steam line 83. Heat rate controller 84 is operatively connected via line 85 to sense temperature of gas upstream of expander sensor 86 which senses the temperature of the gas upstream of expander 16, to differential temperature controller 80 via line 87 and to governor 40 via line 88. Manual speed control 90 is a part of, and provides a manual override for governor 40. Governor 40 is connected to control room 100 via lines 92 and 93 and is actuated upon the closing of switch or button 94. The load set point control 96 is also a part of governor 40 and permits the manual setting of the load.

Operation

The burning of carbonaceous material either at high temperatures or in a restricted oxygen atmosphere produces the hot products of combustion and a significant amount of carbon monoxide which can be passed through an expander for power recovery and subsequently burned as fuel. In the present invention, the high temperature fuel gas is supplied from the regenerator (not illustrated) to the expander for power recovery before delivery to the boiler (not illustrated) for use as a fuel. Prior to startup of the power recovery system, it is assumed that the fluid catalytic cracking process is completely operational and supplying hot fuel gas to the boiler from the regenerator via line 10 and branch line 10c. Valves 12, 14 and 18 will be closed but they are butterfly valves, and not positive shutoff devices, hot gas will be able to leak into the plenum of expander 16. Because, at standstill, the expander temperature should be maintained at a temperature no higher than its maximum design temperature of 600° C., but preferably at a lower temperature of about 350° C., differential temperature controller 80 supplies cooling steam to expander 16 by controlling the position of valve 82. Although differential temperature controller 80 is required to control the temperature difference between the expander inlet gas and the exhaust gas via temperature sensors 74 and 76 during the operative mode, it also is required to protect expander 16 from overtemperature in the startup and shutdown modes of operation. An absolute inlet temperature control is required to prevent overtemperature of the expander 16 during non operating conditions and upset conditions such as afterburn and to this end, heat rate controller 84 causes differential temperature controller 80 to position valve 82 in response to the absolute temperature sensed by temperature sensor 86 during the shutdown mode.

Concurrent with the supplying of cooling steam via line 83, the string oil system (not illustrated) would be in operation to supply cool oil to the bearings. Additionally, the steam seals (not illustrated) of expander 16 should be operational to contain the hot gas within expander 16. The brake water system by which cooling water is supplied to cool brake 28 is regulated by valve 34 in line 32. Valve 34 which is operatively connected to brake controller 66 should be checked out to determine that it is operational. Valve 18 must be opened prior to startup. The high speed trip circuit containing trip 70 would be manually energized and reset which results in the automatic opening of valve 14 which will function as the high speed trip valve. Ordinarily, the trip circuit is a hydraulic circuit, but it may be an electrical circuit.

To start the power recovery string, initial start button or switch 94 in control room 100 would be actuated. This action signals governor 40 to set brake controller 66 at mid range torque control so as to be able to accelerate generator 26 to some point below synchronous speed. As brake 28 is actuated, cooling water will be supplied via line 32 to brake 28. Lack of cooling water will cause a fault signal creating a "no start condition" until this fault is corrected. Manual speed control 90 of the governor 40 is initially set to manual override in order to control the speed of the string. The hot gas expander 16 is then brought up to an operating speed of 1500 RPM which is sensed by shaft speed sensor 46 and in response thereto governor 40 causes valve 12, which serves as the inlet control valve or throttle, to be opened slowly. As valve 12 is opened, regenerator pressure control valve 22 will begin to close in order to maintain the required pressure in the regenerator. At this point, part of the remainder of the regenerator hot gas flow is diverted to the hot gas expander 16 via line 10a. Governor 40 will continue to maintain the expander 16 at 1500 RPM. At this point, it will cease to load expander 16 and permit the string to stabilize. Concurrently, eddy current brake 28 is supplying load torque to the string in accord with the initial torque-load set point as set by load set point control 96. The expander 16 will remain at 1500 RPM to permit all control functions to stabilize. Governor 40 has two range controls; one for start up and one for load control. On load control the governor start up is bypassed. Once the power recovery string has stabilized, the speed will be slowly incremented until the unit is brought up to a speed which is 5% below the synchronous speed of generator 26. The final speed of the expander 16 will depend upon the gear ratios of the gear train 24 which will typically be custom designed for each installation.

Once it is determined that a steady-state mode of operation has been established, generator synchronizer 60 will be activated. Synchronizer 58 will cause brake controller 66 to slowly decrease the power supplied to brake 28 and thereby reduce the resultant torque to permit the string speed to increase to synchronous speed while valve 12 is held in a fixed position. Synchronizer 58 then causes brake controller 66 to incrementally adjust the speed until the frequency of the generator 26 and its load, the electric grid, are brought into phase alignment. At this moment, generator switch gear 52 will automatically be engaged by the governor 40 via line 53. Synchronizer 58 is automatically detached from the system by this action. Manual loading of the generator 26 can now begin. Initially, generator 26 will be loaded to a specified point which is equivalent to "normal" brake load. Generator 26 is then slowly loaded while brake 28 is unloaded. Once the load set point is reached, brake 28 which is connected to a DC source (not illustrated) is de-energized and placed in the "emergency stop ready mode" of brake controller 66. It should be noted that the core (not illustrated) of brake 28 rotates with the string and it is the coils (not illustrated) of the brake 28 that are actually de-energized. The water supplied to brake 28 is automatically stopped by the actuation of fail-safe solenoid valve 34. If supplying internal power, synchronous frequency is maintained by governor 40 which senses shaft speed through shaft speed sensors 46 and 48 and in response thereto causes brake controller 66 to alternately apply or reduce power to the coils of brake 28, as required. However when connected to the electric grid, frequency is maintained automatically and the inlet valve 12 can only load generator 26, it cannot cause speed changes. Thus, once generator 26 is synchronized and "on line", no further speed increase can occur. Further loading of the generator 26 may be accomplished with the manual load set point control 96 of governor 40. With this action, valve 22 will slowly close down to its shutoff position and valve 20 will automatically maintain control of the regenerator pressure.

During start up and loading operations, the expander heating rate is monitored by heat rate controller 84. This is accomplished by a casing temperature feedback to governor 40 which has a pre-programmed heat rate change of between 50° F. and 100° celsius per hour. This heat rate is controlled by steam injection upstream of expander 16 by controlling valve 82 through differential temperature controller 80. Such a start up may range from 2 to 4 hours.

Normally, the system will remain in operation for extended periods of time and shutting down only for periodic maintenance. On a controlled shutdown of the expander string, generator 26 is manually unloaded to a preset load which is equivalent to the design torque-load of eddy current brake 28. Brake 28 is then slowly energized by varying the DC voltage supplied to the coils of the brake until maximum "normal" voltage is applied and the generator 26 unloaded.

Once the total generator power drops to zero output, the switch gear 52 can be disengaged via line 53. The string may then be brought to a stop by manual speed control 90 of governor 40. This permits a scheduled deceleration rate and thermal cool down by the use of steam injection upstream of expander 16. Shutdown could take about 2 hours for a controlled shutdown as contrasted to 10-15 minutes in an emergency. On a controlled shutdown, valve 12 is slowly closed and then valve 14.

Emergency Shutdown

The power recovery string will experience an emergency trip and shutdown as a result of any of the following conditions: (1) generator load drop; (2) load exceeds the thermal capacity of the generator for a specified length of time; (3) load exceeds the combined capacity of the generator and eddy current brake; (4) a fault condition exists within any of the control systems; (5) speed exceeds trip speed or the synchronous speed; (6) low lubrication oil pressure; or (7) high shaft vibration. When any of the first five conditions are experienced, the power recovery string will experience an acceleration. In order to control the acceleration and bring the string to a controlled stop, the following tripping sequence will take place:

(1) A generator load drop will automatically cause brake controller 66 to apply full "emergency torque" to the power recovery string. This torque exceeds the normal mode torque of the brake utilized in the loading and deceleration mode. Additionally, valve 12 is caused to close by a signal from governor 40 directing the initiation of the trip mode.

(2) If the load exceeds the thermal capacity of the generator, load sensor 54 will initiate the emergency load trip after a specified time delay.

(3) If the load exceeds the combined capacity of the generator and brake, the emergency trip procedure will immediately be initiated.

(4) When the power recovery string experiences low oil pressure, governor 40 automatically sends a signal to brake controller 66 to initiate an emergency shutdown. Additionally, a signal is transmitted to actuator 42 to initiate the trip and close mode of valve 12. High shaft vibration initiates a similar trip.

(5) Overspeed of the expander 16 is sensed by governor 40 via shaft speed sensor 46 and in response thereto the governor 40 initiates the trip mode. This governor trip is initiated at 110% of design speed.

(6) As a redundant safety feature, there is a second mechanical trip circuit. Valve 14 is in series with valve 12 which serves as the trip valve in the governor trip circuit. Valve 14 is controlled separately from valve 12 by hydraulic actuator 72 responsive to high speed trip 70 and, in the case of an emergency trip, valve 14 closes first, then valve 12. This circuit is initiated by the mechanical high speed trip 70 at 110% of design speed. Brake controller 66 is also connected to this circuit via line 71 and, therefore, its "emergency stop" mode will be activated. This circuit usually will not be electrical.

(7) Under any of the emergency shutdown conditions, inlet steam line 83 is automatically opened at a programmed rate to permit a uniform cool down even though the expander 16 is not rotating.

(8) The speed trips are always active during any of the unit operations to protect the string. Manual trip switches (not illustrated) should be located near the unit and in the control room 100 in case of an abnormal emergency shutdown requirement.

The preferred brake is of the electromagnetic type, specifically eddy current, since friction brakes cannot fulfill all of the necessary functions and have a high probability of breaking the shaft or burning up during a load dump. The reason that a loading means such as a brake is required in normal operation is a result of the large valves (e.g. 48 to 52 inch) which are located upstream of the expander and which cannot maintain constant speed because of insensitivity. The governor is therefor able to maintain synchronous speed through control of the brake which provides the requisite sensitivity.

Figure 2:
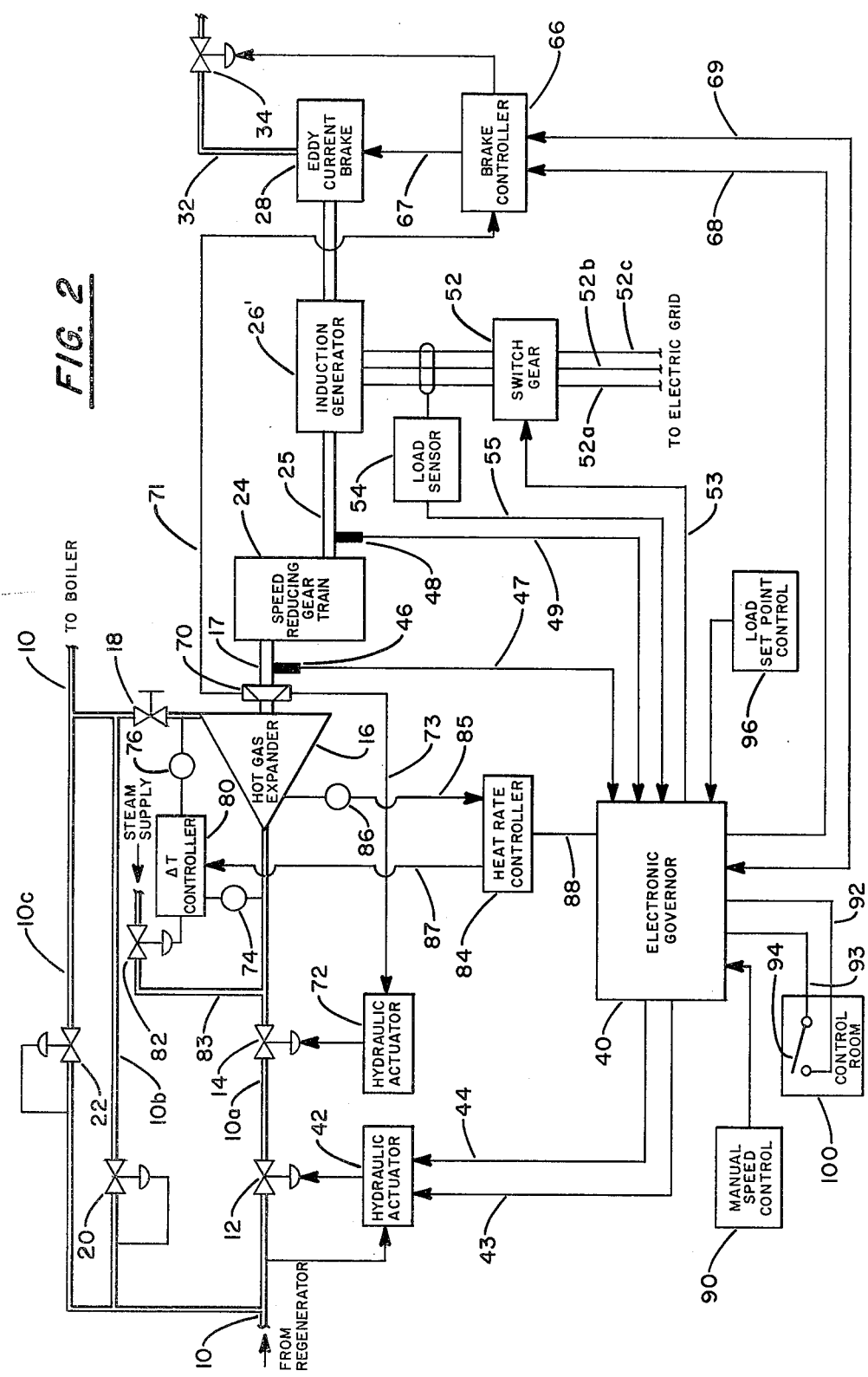
FIG. 2 is a schematic representation of a control system similar to that of FIG. 1 but with the synchronous generator replaced by an induction generator.

As illustrated in FIG. 2, the synchronous generator 26 of the FIG. 1 arrangement can be replaced with an induction generator 26'. Structurally, the only other changes resulting from the use of an induction generator would be the elimination of synchronizer 58 and phase sensor 60 as well as the connections thereto. These features are not required since excitation is provided by the outside line source frequency. The operation of the system will be identical to that of the FIG. 1 arrangement but for the inherent differences in the operation of synchronous and induction generators which are well known to those skilled in the art. For instance, once the induction is across the line a small speed increase fully loads the induction generator 26'. This is because induction generators are able to "slip" the line frequency and load up.

Figure 3:
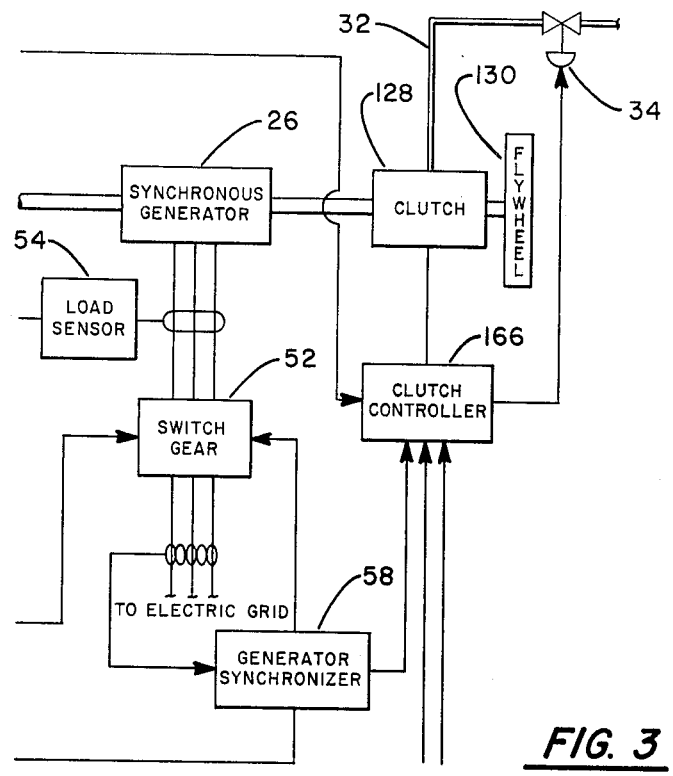
FIG. 3 is a partial schematic representation of a control system similar to that of FIG. 1 but with the eddy current brake replaced by a clutch and flywheel.

Referring now to FIG. 3, the eddy current brake 28 of the FIG. 1 arrangement is replaced with a magnetic or other slip type clutch 128 and flywheel 130. The clutch control 166 like the brake controller 66 of the FIG. 1 arrangement is preferably an Eaton 6000 series controller. As compared to the FIG. 1 system, the FIG. 3 arrangement differs in that the current supplied from controller 166 actuates the windings of a clutch 128 rather than the coils of brake 28. Also, the load is taken up by a flywheel 130 rather than by the brake 28. Typically, the flywheel would be 3–5 feet in diameter with the thickness depending upon the horsepower of the string. Flywheel horsepower will typically range from 2000–5000 horsepower depending upon the size of the expander. On a tripout, the flywheel 130 would have to be disconnected (electrically) once the maximum speed has been attained since there would be a tendency for the flywheel 130 to keep the power recovery string running for a very long period of time. Otherwise, the clutch and flywheel can perform similarly to the brake by increasing the slip in the clutch.

Figure 4:
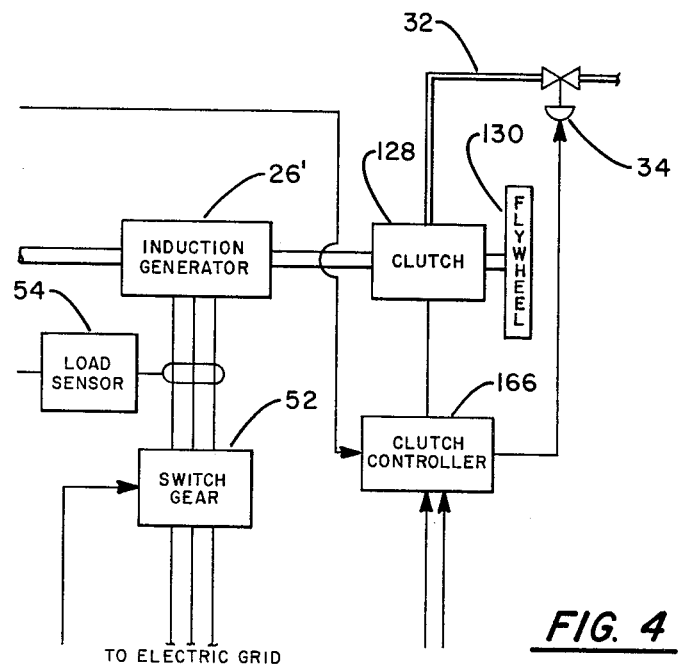
FIG. 4 is a partial schematic representation of a control system similar to that of FIG. 2 but with the eddy current brake replaced by a clutch and flywheel.

The FIG. 4 arrangement is the FIG. 1 arrangement modified by replacing the synchronous generator 26 with an induction generator 26' as was done in the FIG. 2 arrangement and further modified by replacing the eddy current brake 28 with a clutch 128 and flywheel 130 as was done in the FIG. 3 arrangement. The induction generator 26', clutch 128 and flywheel 130 will function as previously described.

Summarizing, the electronic governor 40 and the brake/clutch controller 66/166 are the same in the systems of FIGS. 1–4. Because the brake/clutch controller is capable of handling the speed function as a redundant speed control, line 71 is optional, since trip device 70 sends a signal to governor 40 as well as the brake/clutch controller to apply full power. Valve 34 is required in each case to dissipate the heat generated in the brake or clutch. Also, since the electronic governor 40 is a microprocessor, the functions of the manual speed control 90 and load set point control 96 can be scheduled into the starting function.

The eddy current brake 28 can apply or drop control torque almost instantaneously upon command from the governor 40. Clutch 128 can be used to accelerate the flywheel 130 to provide additional torque/inertia, but its response time is not as good as that of the brake 28. Energy is converted to torque in either case and may be continous, intermittent, or condition responsive depending on the mode of operation since the electronic governor is a microprocessor which can be programmed to react to many modes of operation.

Although a preferred embodiment of the present invention has been illustrated and described, other changes will occur to those skilled in the art. For example, the present invention is applicable to a coal conversion plant or any other installation where waste heat is available as a high mass flow, low density, high specific volume fluid and the normal load is a synchronous generator. It is therefore intended that the scope of the present invention is to be limited only by the scope of the appended claims.

What is claimed is:

1. A system for recovering power from a relatively high temperature waste heat fluid comprising:
    waste heat fluid supply means;
    expansion means connected to said supply means for receiving said relatively high temperature waste heat fluid;
    electrical power generating means operatively connected to said expansion means and operated thereby as a result of the expansion of said fluid in said expansion means;

governor means;
valve means located in said supply means upstream of said expansion means and operatively connected to said governor means for opening and closing in response to signals from said governor means;
means for sensing the rotational speed of said expansion means and for transmitting a signal indicative thereof to said governor means;
means for sensing the load on said electrical power generating means and for transmitting a signal indicative thereof to said governor means;
dynamic power absorbing means;
coupling means operatively connected to said governor means for selectively coupling said dynamic power absorbing means to said expansion means to place a load thereon;
whereby said governor means controls the position of said valve means and the loading of said dynamic power absorbing means to permit normal starting, stopping and operation of said system as well as closing said valve means and fully loading said dynamic power absorbing means during an emergency shutdown of said system.

2. The system of claim 1 wherein said dynamic power absorbing means is an eddy current brake and said coupling means includes a brake controller for activating said eddy current brake.

3. The system of claim 2 further including means operatively connected to said governor means for synchronizing the output of said electrical power generating means.

4. The system of claim 2 wherein said electrical power generating means includes an induction generator.

5. The system of claim 1 wherein said dynamic power absorbing means includes a flywheel.

6. A system for recovering power from a relatively high temperature waste heat fluid comprising:
waste heat fluid supply means;
expansion means connected to said supply means for receiving said relatively high temperature waste heat fluid;
electrical power generating means operatively connected to said expansion means and operated thereby as a result of the expansion of said fluid in said expansion means;
governor means;
valve means located in said supply means upstream of said expansion means and operatively connected to said governor means for opening and closing in response to signals from said governor means;
means for sensing the rotational speed of said expansion means and for transmitting a signal indicative thereof to said governor means;
dynamic power absorbing means;
means for sensing the load on said electrical power generating means and for transmitting a signal indicative thereof to said governor means;
means for sensing the phase of the output of said electrical generating means;
coupling means for selectively coupling said dynamic power absorbing means to said expansion means to place a load thereon and operatively connected to said governor means;
switch gear means for connecting and disconnecting said generating means to a power grid and operatively connected to said governor means;
synchronizer means for synchronizing the output of said electrical generating means and operatively connected to said means for sensing the phase, said switch gear means, said coupling means and said governor means;
whereby control of the system is accomplished by the interaction of said governor means, said coupling means, said synchronizer means, and said switch gear means.

7. The system of claim 6 wherein said dynamic power absorbing means is an eddy current brake and said coupling means includes a brake controller for activating said eddy current brake.

8. A system for recovering power from a relatively high temperature waste heat fluid comprising:
waste heat fluid supply means;
expansion means connected to said supply means for receiving said relatively high temperature waste heat fluid;
valve means located upstream of said expansion means;
electrical power generating means connected to said expansion means and operated thereby as a result of the expansion of said fluid in said expansion means;
means for sensing the rotational speed of said expansion means;
dynamic power absorbing means including a flywheel;
clutch means for selectively coupling said dynamic power absorbing means to said expansion means; and
governor means operatively connected to said valve means, said means for sensing the rotational speed and said clutch means whereby said governor means controls the position of said valve means and the loading of said dynamic power absorbing means to permit normal starting, stopping and operation of said system as well as closing said valve means and fully loading said dynamic power absorbing means during an emergency shutdown of said system.

9. The system of claim 8 wherein said clutch means is a magnetic clutch.

10. A system for recovering power from a relatively high temperature waste heat fluid comprising:
waste heat fluid supply means;
expansion means connected to said supply means for receiving said relatively high temperature waste heat fluid;
electrical power generating means operatively connected to said expansion means and operated thereby as a result of the expansion of said fluid in said expansion means;
governor means;
valve means located in said supply means upstream of said expansion means and operatively connected to said governor means for opening and closing in response to signals from said governor means;
means for sensing the rotational speed of said expansion means and for transmitting a signal indicative thereof to said governor means;
dynamic power absorbing means including a flywheel;
means for sensing the load on said electrical power generating means and for transmitting a signal indicative thereof to said governor means;

means for sensing the phase of the output of said electrical generating means;

clutch means for selectively coupling said dynamic power absorbing means to said expansion means to place a load thereon and operatively connected to said governor means;

switch gear means for connecting and disconnecting said generating means to a power grid and operatively connected to said governor means;

synchronizer means for synchronizing the output of said electrical generating means and operatively connected to said means for sensing the phase, said switch gear means, said clutch means and said governor means;

whereby control of the system is accomplished by the interaction of said governor means, said clutch means, said synchronizer means, and said switch gear means.

11. A method for recovering power from a relatively high temperature waste heat fluid comprising the steps of:

expanding the waste heat fluid through a turbomachine;

generating electrical power as a result of the expansion of the fluid; and selectively loading said turbomachine to maintain the generation of electrical power in a steady-state condition during normal operating conditions and to fully load said turbomachine during non steady-state conditions and to shut down said turbomachine.

12. A method for recovering power from a relatively high temperature waste heat fluid comprising the steps of:

expanding the waste heat fluid through a turbomachine;

sensing the rotational speed of said turbomachine;

generating electrical power as a result of the expansion of the fluid;

sensing the load on said electric power;

sensing the phase of the electric power; and selectively loading said turbomachine responsive to the sensed rotational speed, load and phase to maintain the generation of electrical power in a steady-state condition during normal operating conditions, and to shut down said turbomachine during an emergency shutdown.

* * * * *